July 5, 1927.

A. BIRCH 1,634,821

PACKING DEVICE FOR STEAM JOINTS OF DRIER CYLINDERS AND THE LIKE

Filed Oct. 9, 1924

Inventor:
Arthur Birch
by Chas. F. Randall
Attorney.

Patented July 5, 1927.

1,634,821

UNITED STATES PATENT OFFICE.

ARTHUR BIRCH, OF ARLINGTON, MASSACHUSETTS.

PACKING DEVICE FOR STEAM JOINTS OF DRIER CYLINDERS AND THE LIKE.

Application filed October 9, 1924. Serial No. 742,600.

Drier cylinders, and certain other cylinders employed for various purposes in the arts, are given the required temperature by means of the flow of some fluid, usually steam in the case of a heated cylinder, into or through the cylinder by way of a hollow journal or journals with which the cylinder is provided. The bearing for a hollow journal, within which the journal rotates, is packed around the said journal to prevent the escape of the steam or other fluid employed, and in conjunction with a ring of packing, devices are employed to hold the said ring in place and compress it into the required close fit. As heretofore constituted the said devices have been unsatisfactory in practice by reason of different disadvantages and drawbacks. The general object of the invention is to provide adjustable packing holding and compressing devices free from such disadvantages and drawbacks.

Figure 1:
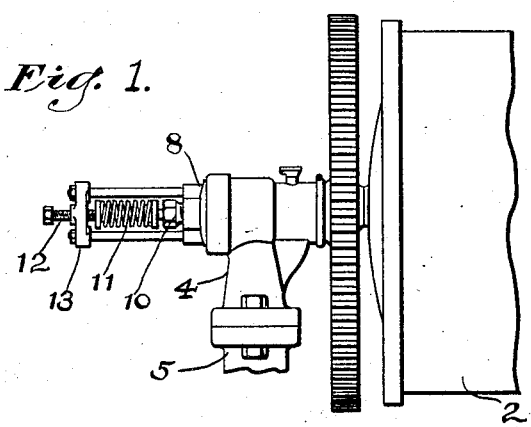

An illustrative embodiment of the invention is shown in the accompanying drawings, in which latter Fig. 1 is an elevation of one end-portion of a cylinder, a gear wheel connected therewith, and a bearing receiving the corresponding cylinder-trunnion, with said embodiment combined therewith.

Figure 2:
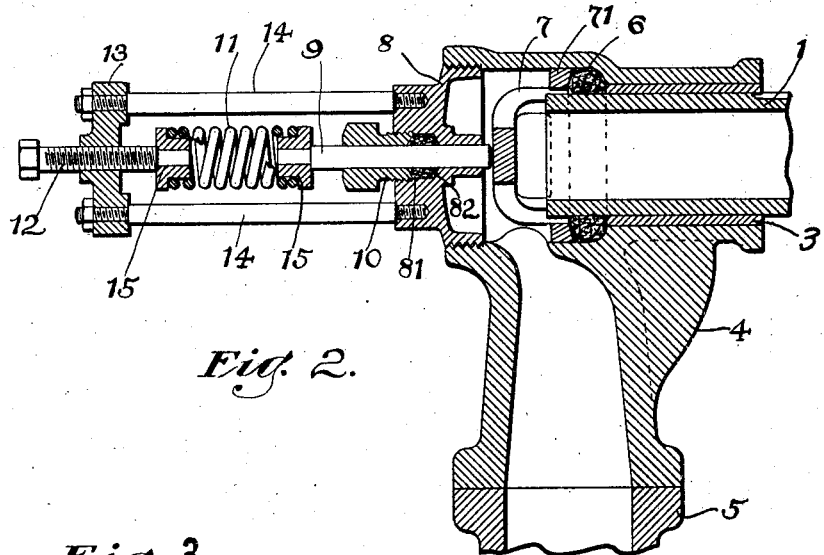

Fig. 2 is a view on a larger scale than Fig. 1, showing the trunnion and its bearing, and the packing adjusting devices comprised in the said embodiment.

Fg. 3 is an elevation showing the packing adjusting devices separately.

Figure 3:
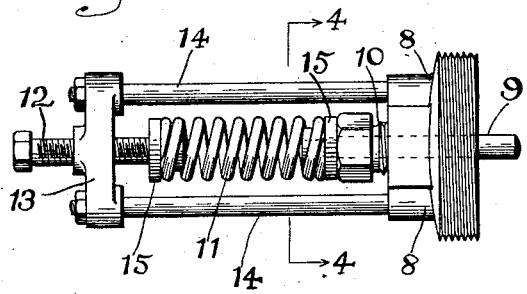
Figure 4:
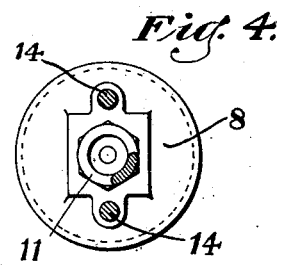

Fig. 4 is a view in cross-section on line 4, 4, of Fig. 3.

In practice it is common to mount a hollow journal 1 (Fig. 2) of a hollow rotary cylinder 2 (Fig. 1) within a bushing 3 (Fig. 2) in a bearing pedestal 4 upon the top of a fixed support 5, the said journal being permitted to rotate inside the said bushing and both the said support and the bearing pedestal being chambered to permit flow of the steam or other fluid through the hollow journal. It is usual to place around the inner portion of the said rotary journal within a seat at the inner end of said bushing a ring of packing 6, Fig. 2, to prevent outflow of said fluid between the exterior of the journal and the interior of the bushing of the bearing, and further it is usual to employ within the chamber of the pedestal a spider, as 7, Fig. 2, having a ring-shaped portion 71 which makes contact with the packing-ring. With such spider is combined ordinarily adjustable means for pressing it with the requisite force against the packing-ring, to compress the latter snugly against its seat and the exterior of the hollow journal, as will be understood from Fig. 2 of the drawings. An opening in the back of the chambered pedestal is closed by means of a removable plug 8, which is screwed into place. When this plug is out of the said opening, access to the interior of the chamber is permitted, and the packing-ring and spider may be placed in position, or removed and replaced.

In accordance with the invention I locate the adjustable pressure devices externally of the pedestal, so that they are both visible and readily accessible. For the purpose of establishing operative connection between the said externally located devices and the spider 7 located within the chamber of the bearing, I employ a pin 9 which is disposed axially with respect to the said spider and the plug 8, it extending through a central axial hole in the plug and engaging by its inner end with the central portion of the spider. To prevent leakage through said central hole around the said pin, the plug is formed at its outer side with a central chamber 81 in which is placed packing 82 that is compressed upon the pin by means of a smaller plug, 10, having also a central hole through which pin 9 extends. The outer portion of the pin projects beyond the smaller plug and is engaged by tension-spring devices by means of which pressure is exerted upon the pin with a tendency to push it lengthwise inward so as to bear the ring 71 of the spider against the packing 6. The tension spring devices comprise essentially an expanding spiral spring 11 and an adjustment screw 12. The threaded stem of the said screw occupies a threaded hole in a cross-bar 13 carried by the outer ends of two rods, 14, 14, projecting parallel with each other outward from the main plug 8. The tension spring is interposed between the inner end of the screw 12 and the outer end of the pin 9, and its tendency to expand lengthwise exerts the pressure aforesaid against the pin. With the screw and pin are combined convenient abutments for the respective ends of the spring, constituted by collars, 15, 15, fitted upon reduced end-portions of the screw and pin, in contact with adjacent shoulders formed upon the screw and pin. The collars have peripheral collars against which the ends of the spring take bearing.

By adjustment of the screw endwise, effected by rotating the same within the screw-threaded hole through the cross-bar 13, the spring is compressed endwise, or allowed to expand reversely, as may be desired in tightening up or slacking off.

The described tension and adjustment devices, by reason of being located externally of the bearing and its chamber, are clearly visible. Their condition, and their adjustment are apparent to the eye of an attendant.

What is claimed as the invention is:—

1. The combination with a rotary cylinder having a hollow journal, a chambered bearing within which said journal rotates, said parts providing for flow of fluid through said journal between the bearing-chamber and the interior of the cylinder, packing around said journal within which the latter rotates, and a compression-spider for said packing, of spring-pressure devices located visibly externally of the said bearing, operatively combined with said spider, and including a screw by which the tension of the spring is adjusted as required.

2. The combination with a rotary cylinder having a hollow journal, a bearing within which said journal rotates having a fluid-chamber communicating with the passage through said journal, packing around said journal within which the latter rotates, a compression-spider for said packing, and an axially-located pin extending through a hole in one side of the chamber into engagement with said spider, a spring tending to bear said pin endwise to press the spider against the packing, and means for adjusting the tension of the spring, with said spring and adjusting means located visibly externally of the bearing and its chamber.

3. The combination with a rotary cylinder having a hollow journal, a bearing within which said journal rotates having a fluid-chamber communicating with the passage through said journal, and having also an opening aligned with said journal, a plug applied removably to said opening, packing around said journal in connection with said bearing, and a compression-spider for said packing, of an axially-located pin extending through a hole in said plug into engagement with said spider packing in connection with said plug for said pin, a pressure spring engaged with the outer end of said pin, an adjustment screw engaged with said spring, and a screw threaded bearing for said screw carried by the said plug.

4. The combination with a cylinder having a hollow journal, a bearing for said journal having a fluid-chamber communicating with the passage through said journal, and having also an opening aligned with said journal, a plug applied removably to said opening, packing around said journal, and a compression-spider for said packing, of an axially-located pin extending through a hole in said plug into engagement with said spider, a pressure spring engaged with the outer end of said pin, an adjustment screw engaged with said spring, a screw threaded bearing through which said screw extends and rods extending outward from the said plug supporting by their outer portions the said screw-threaded bearing.

ARTHUR BIRCH.